_United States Patent Office_

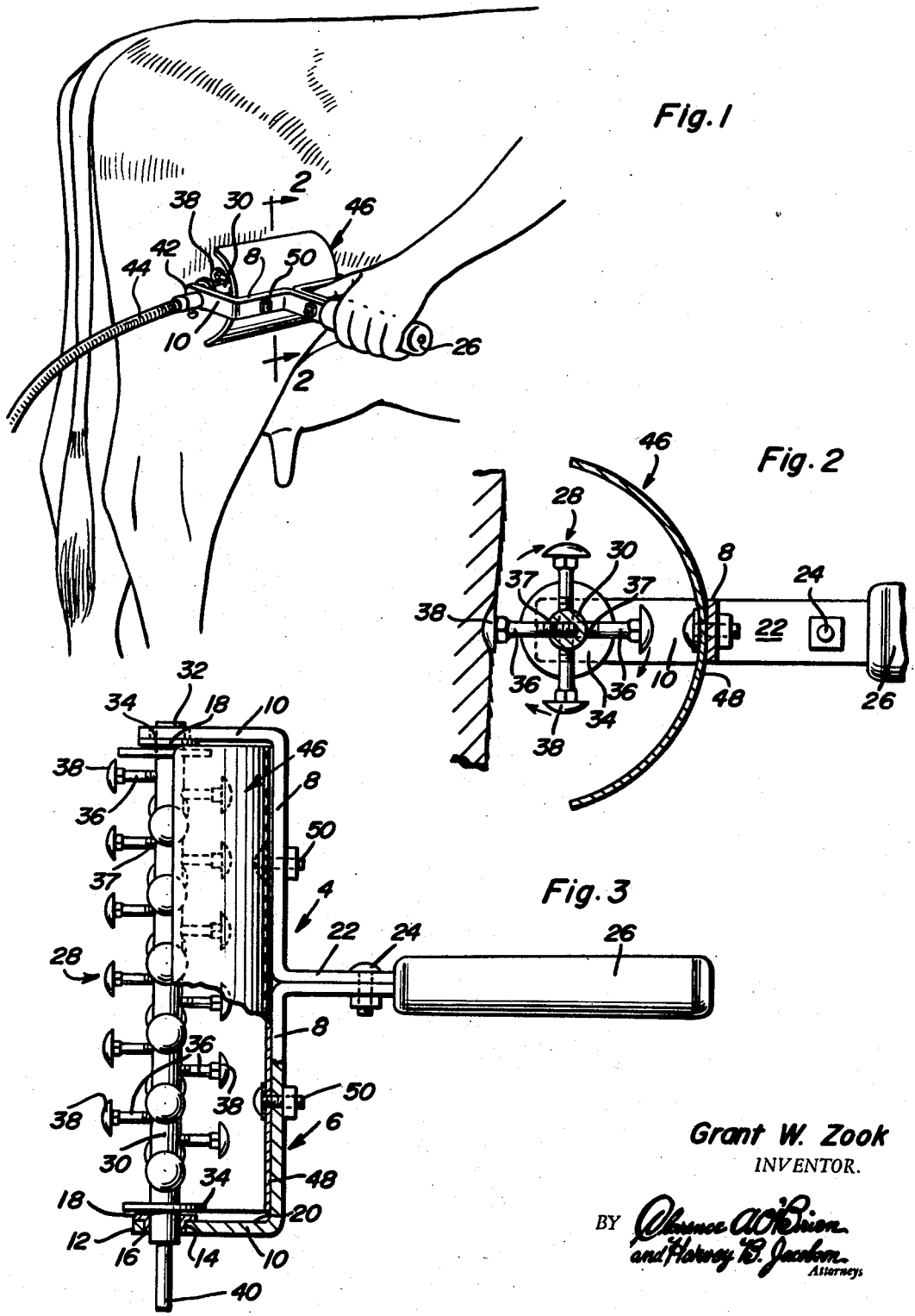

3,495,574
Patented Feb. 17, 1970

3,495,574
COW CLEANING DEVICE
Grant W. Zook, 2 Hartzell Ave., Telford, Pa. 18969
Filed July 26, 1967, Ser. No. 656,203
Int. Cl. A01k *13/00*
U.S. Cl. 119—91        6 Claims

ABSTRACT OF THE DISCLOSURE

The hand controllable implement shown is preferably, but not necesarily, power driven and has been experimentally and acceptably used for dislodging, removing loose hair, dirt, filth and the like closely adhering to the coat of an animal, a cow for example. It is characterized by a cleaning head rotatable on a handle-equipped yoke. This yoke supports a shield partially encompassing the specially designed pummeling and currying teeth on the cleaning head.

---

This invention relates to certain new and useful improvements in hand-held implements such as are constructed and specially adapted for currying, rubbing, massaging and cleaning the coat of an animal, a cow for example, and has to do with an implement, wherein a rotatably mounted currycomb which, while capable of rotation by frictional contact with the animal's epidermis, is driven by a flexible power shaft.

Anyone conversant with currycombs, rotary brushing implements, and massaging appliances is doubtless aware that a cow cleaning device of the general character above stated is not new. As a matter of fact, the general state of the art may well be exemplified in (1) Walker's grooming device Patent 431,497 and (2) a generally analogous motor driven shield-equipped currying, brushing and grooming device shown in the patent to Jepson 2,753,583.

A general objective in the instant matter is to provide what is believed to be an advanced type cow cleaning device which is structurally unique, has the self-contained features and capabilities desired, well serves the handling purposes for which it has been devised, and achieves the improved end result desired.

With further reference to the art of currycombs and animal coat cleaners, it can also be pointed out that surface and epidermis contacting elements known to be old can be and often are cup-shaped, consist of brush bristles, spikes, stiff but pressure-responsive wires, helically-arranged teeth and other adaptations for scraping and combing needs. The herein disclosed rotary cleaning head is novel in that it comprises a shaft spanning the arms of a yoke and having its ends journaled for rotation in suitable bearings. This shaft has rigid pins radiating therefrom, the outer ends of the pins being provided with convex button-like heads properly staggered and distributively arranged for desired currying, massaging and coat smoothing and cleaning purposes.

More specifically, the frame part of the over-all device comprises a handle-equipped yoke. This yoke is preferably made up of companion duplicate sections each in the form of a strap and having L-shaped portions and shank-forming portions wherein the latter portions are bolted together and provided with a handgrip. The terminal or short limbs of the L-shaped components or sections are provided with flanged bushings providing bearings for journals at the ends of the aforementioned shaft.

In carrying out the preferred embodiment of the invention the shaft is provided at its opposite ends with limit stop flanges and the terminal end portions outwardly of the respective flanges provide the aforementioned journals. The shaft proper is provided with rigid pins suitably staggered and radiating from the shaft at properly distributed places. These pins have screw-threaded shanks removably screwed into threaded sockets, are replaceable, and provide the novel projections. The outer terminal ends of these pins are provided with rigid convex button-like heads which have been found to be ideal for safe and satisfactory cleaning and grooming results.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a cow cleaning device constructed in accordance with the invention and also showing the manner in which it is aptly and satisfactorily used.

FIG. 2 is an enlarged cross-section taken on the plane of the section line 2—2 of FIG. 1.

And FIG. 3 is a view in top plan and wherein portions are shown in elevation and other portions are broken away and shown in section.

The aforementioned yoke is preferably, but not necessarily, of sectional construction. The duplicate flat strap metal units or sections are denoted at 4 and 6 respectively. Each section is the same in construction and is characterized by a substantially L-shaped portion which embodies a long leg or limb 8 and a short leg or limb 10 at right angles to the long leg. As best shown in FIG. 3 the outer or free end portion 12 is provided with an opening or hole 14 to accommodate the bushing 16 which is fitted therein. The bushing is provided with an assembling and retaining flange 18 which abuts a coacting flat surface 20 of the aforementioned short leg 10. Each section is also provided with an extension and both extensions 22 are fitted together and secured by a bolt or equivalent fastener 24. The end portions of the extensions project into a socket provided therefor in an appropriate anti-slipping rubber, plastic or equivalent handgrip 26.

This handle-equipped yoke or frame provides an effective support and holder for the aforementioned pressure-responsive coat contacting and cleaning head means. The latter means is denoted, as an entity, by the numeral 28. This head in turn is provided with a rigid shaft 30 which spans the space between the arms or limbs 10. One end portion is fashioned into an appropriate journal 32 which is rotatable in the bushing 16 provided therefor. In addition, the end portion is provided with a flange 34 which abuts the flanged portion 18 of the coacting bushing. The radial distributively arranged and rigid projections, which are of great significance here, have been found as a result of experimental use to effectively serve the purposes desired. Each projection comprises a rigid pin or stud 36 whose inner screw-threaded end or shank 37 is removably and adjustably screwed into a threaded socket provided therefor in the shaft 30. All of the pins are of the same length and are circumferentially spaced and may, if desired, be staggered. The outer end of each pin 36 is provided with a convex button-like pressure-responsive head 38.

The means 28, construed as a unit, is identified broadly as head means and specifically as a shaft with radial distributively arranged rigid pins or projections having headed terminal ends as at 38 and which provide the desired currying, massaging and cleaning result which can be attained in the manner suggested in FIG. 2.

In actual practice one end portion of the shaft is provided with an axle 40 to accommodate a coupling 42 on a flexible power supply shaft 44, as shown in FIG. 1.

With a view toward increasing the over-all efficiency the yoke also supports a substantially semi-circular plate 46 which provides a guard or shield and properly encompasses a cooperating half portion of the reel-like head means 28. The median or body portion 48 of the shield abuts the limbs 8 and is fastened thereto by bolt and nut means denoted generally at 50.

The cow cleaning device herein shown and described has been actually constructed and used and has been found to be possessed of the capabilities desired in achieving highly efficient currying, cleaning and grooming results.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hand-held and manipulable currycomb-type cow cleaning device comprising a handle-equipped yoke having spaced arms provided with bearings, rotatable cleaning head means embodying a shaft having end portions constituting journals, said journals being mounted for rotation in their respective bearings, said shaft being provided with rigid radial spike-like projections, each radial spike-like projection comprising a pin, said pin having an animal coat currying and cleaning head on the outer end thereof, said head being button-like generally circular in shape and provided with a convex surface, the convex surface being disposed outwardly and thus adapted to reside in currying and combing contact with the aforementioned animal coat when being used.

2. The cow cleaning device defined in and according to claim 1, and wherein said yoke comprises a pair of duplicate companion sections, each section embodying a substantially L-shaped portion characterized by a long limb and a short limb, said short limb constituting one of the aforementioned arms, the inner adjacent ends of the long limbs being provided with face-to-face strap-like components arranged in abutting relation and secured together to constitute a shank, and a handgrip having an axial socket into which said shank is telescopingly projected and securely retained.

3. The cow cleaning device defined in and according to claim 1 and wherein said shaft is provided at one end with a spindle-like axle, said axle projecting and being adapted to accommodate an attaching coupling on an attachable and detachable flexible power shaft.

4. The cleaning device defined in and according to claim 1, and wherein said shaft is provided with distributively located radial screw-threaded closed-bottom sockets, the coacting inner ends of said pins being screw-threaded and providing shanks and said shanks being adjustably and threadedly screwed into their respectively cooperable sockets.

5. The device defined in and according to claim 1, and wherein each bearing embodies a flanged bushing, and wherein, in addition, the end portions of said shaft inwardly of the respective arms are provided with flanges, said flanges constituting abutments and said abutments being capable of abutting the respectively cooperating bushings.

6. The cleaning device defined in and according to claim 1 and, in combination, a substantially semi-circular plate constituting a shield and situated between the respective arms of said yoke and having a median lengthwise convex portion abutting and fixed on a cooperating portion of the yoke, the concave side of said shield confronting and partially encompassing a coacting half-portion of said head means.

References Cited
UNITED STATES PATENTS

| | | | |
|---|---|---|---|
| 431,497 | 7/1890 | Walker | 119—91 |
| 843,222 | 2/1907 | Luther | 15—198 X |
| 1,921,064 | 8/1933 | Barker | 119—91 |
| 3,015,121 | 1/1962 | Ulrich. | |

HUGH R. CHAMBLEE, Primary Examiner